K. T. F. JUNG.
DISTANCE AND SPEED INDICATOR FOR SHIPS.
APPLICATION FILED AUG. 26, 1916.

1,354,832.

Patented Oct. 5, 1920.

Inventor
Karl Torsten Fredrik Jung

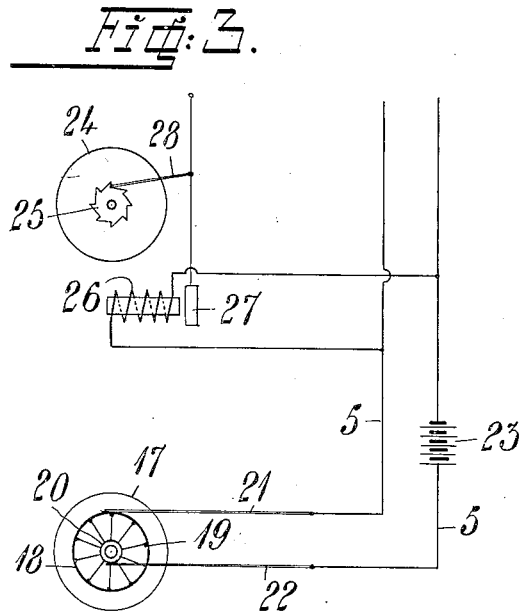
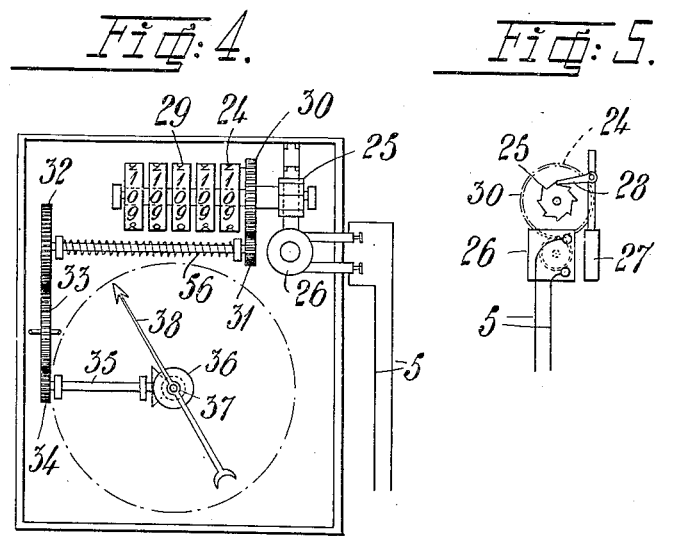

UNITED STATES PATENT OFFICE.

KARL TORSTEN FREDRIK JUG, OF KALMAR, SWEDEN.

DISTANCE AND SPEED INDICATOR FOR SHIPS.

1,354,832.    Specification of Letters Patent.    Patented Oct. 5, 1920.

Application filed August 26, 1916. Serial No. 117,114.

*To all whom it may concern:*

Be it known that I, KARL TORSTEN FREDRIK JUNG, a subject of the King of Sweden, and resident of Kalmar, Sweden, have invented certain new and useful Improvements in Distance and Speed Indicators for Ships, of which the following is a specification.

The present invention relates to devices for indicating the speed of a vessel and registering the distance traveled.

Speed and distance indicators, based on the use of a Pitot tube and a static tube, are known.

It is also known to translate the action of such indicators to a suitable place at a distance from the tubes by means of a closed fluid conduit. Such arrangement, however, has various disadvantages and, in order to operate correctly, is comparatively complex.

The present invention relates in particular to an arrangement, in which the difference between the pressures in the Pitot and static tube is directly made to operate a central distance indicator located in the submerged part of the vessel and the indication is electrically transmitted to a suitable point of observation.

For a fuller understanding of the invention reference is made to the appended drawings, in which—

Fig. 3 shows a schematic view of the electrical connections between the central instrument and a secondary instrument.

Fig. 4 is a plan view of a secondary instrument, and

Fig. 5 is a detail.

Figure 1:
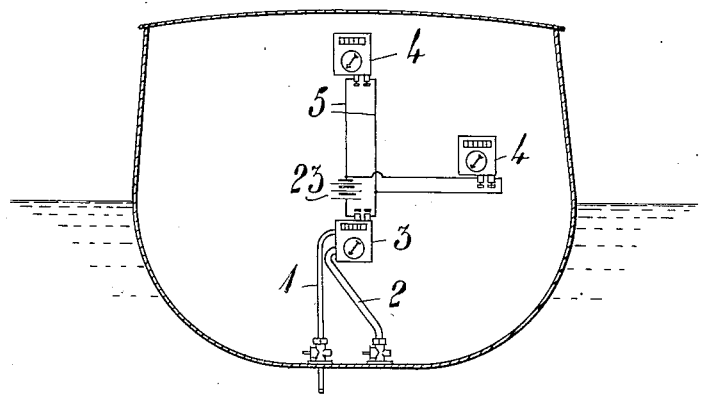
Figure 1 shows the arrangement in its entirety on a ship with a central instrument and two secondary instruments.

In Fig. 1, 1 is the Pitot tube, 2 the static tube, 3 the central instrument, 4 the secondary instruments and 5 the electrical line. The instruments 4 could be coupled in series or parallel.

Figure 2:
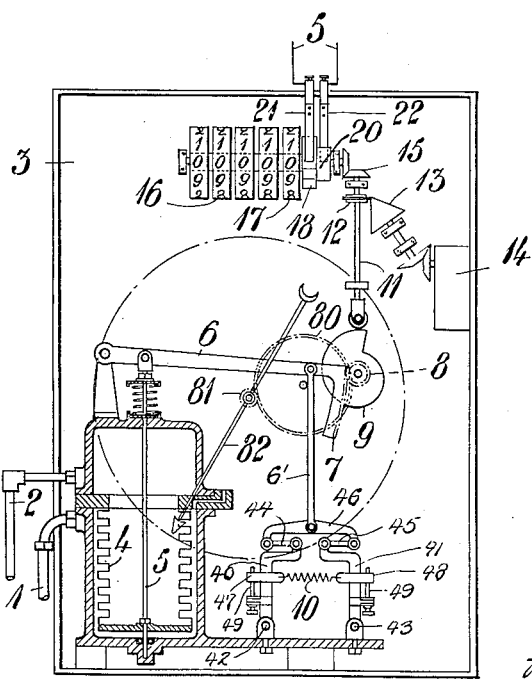
Fig. 2 shows the central instrument.

In Fig. 2, 1 is the Pitot tube, 2 the static tube, these tubes opening at both sides of the bellows 4'. The speed pressure is transferred through the rod 5, the lever 6, the cog sector 7 and the gear wheel 8 on the cam disk 9. The speed pressure transferred to the lever 6 is balanced by a spring 10 arranged in suitable manner. As shown two arms 40 and 41 are pivotally connected to lugs 42 and 43 at one end and to arms 44 and 45 at the other end, which arms are in turn pivotally connected to the opposite ends of a yoke 46. This yoke 46 is centrally pivoted to rod 6' which is pivotally connected to lever 6. The spring 10 is attached to the arms 40 and 41 by lugs 47 and 48 and suitable adjusting screws 49 may be applied to adjust the position of the spring on the arms. The spring tends to hold the parts in the position shown. When the rod 5 presses against the lever 6, the rod 6' is pulled upwardly against the tension of the spring. The cam disk 9 is so formed that shaft 11 supporting the frictional disk 12 receives a movement proportional to the speed of the ship. The disk 12 rests on the cone 13 driven by the clock work 14. It is understood that the shaft 11 is composed of a stationary part carrying the gear 15 and a movable part carrying the disk 12 and that these two parts are slidable relatively to each other but turn as a unit. The number of revolutions of the same proportionally to the distance run of the ship is then transferred by the gear 15 to the distance counter 16, indicating the distance in knots or kilometers. The speed indicator 82 is also operated by the gear wheel 8 with aid of the gear wheels 80, 81.

With the lowest unit disk 17 of the counting mechanism is directly or indirectly connected a contact disk 18. On the circumference this disk 18 is provided with ten contacts corresponding with the numbers on the counter disk 17 and electrically connected with the collector 20. On the contacts 19 and the collector 20 are sliding contacts 21, 22, connected with an electrical line 5, fed from some suitable electrical source 23. 24 (Figs. 3 and 4) designates the lowest unit disk on the secondary distance indicator, this disk being directly or by aid of a suitable gear connected with a ratchet wheel 25, the teeth of which correspond with the 10 numbers on the number disk 24. 26 is an electromagnet, the armature of which by aid of the elastic catch 28 operates the teeth of the ratchet wheel 25. The electromagnet is connected with the line 5. It is obvious that every time the unit disk 17 of the counter 16 turns a unit the contact 21 will be brought in connection with one of the contacts 19, the circuit will be closed, the electromagnet will attract its armature 27 and the ratchet wheel will be turned a tooth by the catch 28. In this manner the secondary counter 29 will move synchronously with the central counter 16.

Fig. 4 shows a distance indicator, such as just described, and means for simultaneously indicating the speed of the vessel.

To the lowest unit disk 24 is connected, aside from the ratchet wheel 25, a gear wheel 30 which by means of a suitable pinion 31, shaft 56 and gears 32, 33 and 34 drives the shaft 35, which in turn by means of a bevel gear 36 rotates the shaft 37. The shaft 37 carries an indicating arm or pointer 38 which directly indicates the speed. The speed of rotation of shaft 37 is, since the movement of the clock work is constant, directly proportional to the speed pressure, as it should be and correctly indicates the speed of the vessel. The shaft 37 is preferably the shaft of a magnetic speedometer whereby the speed of the vessel may be conveniently indicated.

In order to translate the intermittent motion of gear 31 into uniform continuous motion of the shaft 37, I interpose between gears 31 and 32 a flexible and elastic part, for instance a helical spring wound on shaft 56.

It is understood that the details of construction may be changed in various ways without going outside the scope of the invention. What is shown, is only for the purpose of illustration.

I claim:—

1. The combination of a Pitot tube and a static tube, means adjacent said tubes for indicating the difference between the speed and static pressures, a speed indicator and a revoluble counter, means connected with said means and with the counter for revolving the counter at a speed which is proportional to the difference between the speed and static pressures and means for translating the movement of the counter to the speed indicator.

2. Apparatus according to claim 1 in which the speed indicator is of the magnetic speedometer type.

3. Apparatus according to claim 1 including a second counter and electrical means connected with the first counter for moving the second counter substantially in synchronism therewith.

In testimony whereof I have signed my name to this specification in the presence of two subscribing witnesses.

KARL TORSTEN FREDRIK JUNG.

Witnesses:
 JOHAN MAX GURAN,
 GRETA PRIEN.